United States Patent
Sun

(10) Patent No.: US 9,374,748 B2
(45) Date of Patent: Jun. 21, 2016

(54) METHOD OF CONTROLLING INTERFERENCE IN HETEROGENEOUS NETWORK

(71) Applicant: SAMSUNG SDS CO., LTD., Seoul (KR)

(72) Inventor: Jong-Suk Sun, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/584,261

(22) Filed: Dec. 29, 2014

(65) Prior Publication Data

US 2016/0119835 A1 Apr. 28, 2016

(30) Foreign Application Priority Data

Oct. 22, 2014 (KR) .................. 10-2014-0143465

(51) Int. Cl.
| | |
|---|---|
| H04W 36/00 | (2009.01) |
| H04W 36/04 | (2009.01) |
| H04W 36/14 | (2009.01) |
| H04W 36/20 | (2009.01) |
| H04W 16/32 | (2009.01) |

(52) U.S. Cl.
CPC ............. *H04W 36/04* (2013.01); *H04W 16/32* (2013.01); *H04W 36/0088* (2013.01); *H04W 36/14* (2013.01); *H04W 36/20* (2013.01)

(58) Field of Classification Search
USPC ........................................ 455/444, 436, 449
See application file for complete search history.

(56) References Cited

U.S. PATENT DOCUMENTS

2013/0281089 A1* 10/2013 Chandrasekhar ..... H04W 24/02
455/434

FOREIGN PATENT DOCUMENTS

| JP | 2013-236261 A | 11/2013 | |
| JP | EP 2675204 A1 * | 12/2013 | .......... H04W 28/048 |
| KR | 10-2012-0080514 A | 7/2012 | |
| KR | 10-2013-0107158 A | 10/2013 | |
| WO | 2012/108154 A1 | 8/2012 | |

OTHER PUBLICATIONS

Sun, "Small Cell Range Expansion Considering Dynamic ABS Ratios in LTE-Advanced Heterogeneous Networks", Thesis, Department of Information & Communication Graduate School of Information and Communication Technology, Ajou University, Jun. 2014, 64 pages total.

* cited by examiner

*Primary Examiner* — Vladimir Magloire
*Assistant Examiner* — Sayed T Zewari
(74) *Attorney, Agent, or Firm* — Sughrue Mion, PLLC

(57) ABSTRACT

Provided is a method of controlling interference in a heterogeneous network environment. The method includes: a first operation of measuring, by a terminal located in a coverage area of a macro cell base station, signal strengths of the macro cell base station and a small cell base station, and broadcasting or unicasting, by the small cell base station, data having a cell range expansion (CRE) value; a second operation of transmitting a CRE flag value to the small cell base station by performing a hand-off to the small cell base station according to a result of comparison of the signal strengths of the small cell base station and the macro cell base station, which is obtained from the first operation; and a third operation of respectively counting terminals located in a CRE area and terminals located in a coverage area of the small cell base station, based on the CRE flag value received through the terminal at a predetermined period for measurement, and transmitting the counting data to the macro cell base station.

15 Claims, 5 Drawing Sheets

METHOD OF CONTROLLING INTERFERENCE IN HETEROGENEOUS NETWORK

CROSS-REFERENCE TO RELATED PATENT APPLICATION

This application claims the benefit of Korean Patent Application No. 10-2014-0143465 filed on Oct. 22, 2014, in the Korean Intellectual Property Office, the disclosure of which is incorporated herein in its entirety by reference.

TECHNICAL FIELD

The present invention relates to a method of controlling interference in a heterogeneous network, and more particularly, to a method of controlling interference in a heterogeneous network, capable of randomly expanding a small cell coverage area by applying a cell range expansion (CRE) scheme in a heterogeneous network environment, minimizing a signal interference of a terminal located in an expanded coverage area, and significantly improving the network performance of the entire network by applying the optimum ratio of an almost blank subframe (ABS).

BACKGROUND ART

In general, a wireless communication system has been widely developed to provide various types of communication services, such as voice and data.

The wireless communication system represents a multiple access system supporting communications with multiple users by sharing available system resources (bandwidth and transmission power).

For example, the multiple access system may include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In addition, in order to improve the capacity of wireless communication by 1000 times with the aim of achieving 5G technology in 2020 in Korea, various technologies have been studied, for example, MIMO & Advanced Receiver, Smart Scheduler, eCoMP, Carrier Aggregation, New Bands, Advanced macros, HetNets Management, and Flexible small cells.

In particular, heterogeneous network technology (HetNets) having various cells exist within a close area is a technology for enhancing the capacity of the entire network by decreasing the size of cells and increasing the number of cells.

For example, HetNets is provided to enhance the capacity of the entire network by minimizing the size of cells and increasing the number of cells, and is known as the most effective technology capable of maximizing a data distribution effect (Off Loading) between terminals (user equipment) in a hot spot region by deploying a plurality of small cells within in a macro cell area.

The small cell represents a lower power base station, and is classified into a microcell, a picocell, and a femtocell depending on a transmission power and an installation location thereof, and even the simple deployment of small cells enables the capacity of the entire network to be increased. However, by enabling a terminal to use better uplink resources of the small cells through a cell range expansion (CRE) scheme, the network capacity is more increased without additional physical resources.

However, the above described CRE scheme may cause frequency interference of terminals located at an edge of a heterogeneous environment since the terminals use the same frequency in the heterogeneous environment.

In addition, the terminals located in an area expanded through the CRE scheme are subject to more serious interference by a macro cell that provides a better downlink signal.

Accordingly, such signal interference is the main factor of degrading the throughput of a terminal, and there is an urgent need to mitigate signal interference in 3GPP Rel-10, 11.

PRIOR ART

Korean Patent Publication No. 2013-0107158 (2013 Oct. 1)

DISCLOSURE

Technical Problem

The present invention is directed to randomly expand a small cell coverage area by applying a cell range expansion (CRE) scheme in a heterogeneous network environment, minimize a signal interference of a terminal located in an expanded coverage area, and significantly improve the network performance of the entire network by applying the optimum ratio of an almost blank subframe (ABS).

The object to be solved by the invention is not limited to the above, and other objects not mentioned above will be readily understood to those skilled in the art through the following description.

Technical Solution

One aspect of the present invention provides a method of controlling interference in a heterogeneous network environment, the method including: a first operation of measuring, by a terminal located in a coverage area of a macro cell base station, signal strengths of the macro cell base station and a small cell base station, and broadcasting or unicasting, by the small cell base station, data having a cell range expansion (CRE) value; a second operation of transmitting a CRE flag value to the small cell base station by performing a hand-off to the small cell base station according to a result of comparison of the signal strengths of the small cell base station and the macro cell base station, which is obtained from the first operation; and a third operation of respectively counting terminals located in a CRE area and terminals located in a coverage area of the small cell base station, based on the CRE flag value received through the terminal at a predetermined period for measurement, and transmitting the counting data to the macro cell base station.

The third operation may include a fourth operation of obtaining the counting data through the small cell base station located in the coverage area of the macro cell base station, calculating an almost blank subframe (ABS) ratio by using the counting data, sending the small cell base station ABS data to which the calculated ABS ratio is applied, and scheduling, by the small cell base station, the terminal located in the CRE area by using the ABS data received from the macro cell base station.

In the second operation, the terminal may transmit a CRE flag value to the small cell base station by performing a handoff to the small cell base station if the signal strength of the small cell base station is greater than the signal strength of the macro cell base station, and transmit a CRE flag value to the small cell base station by performing a handoff to the small cell base station, according to the CRE flag value of the terminal based on a comparison result between the signal strength of the small cell base station having the CRE value applied thereto and the signal strength of the macro cell base station, if the signal strength of the small cell base station is smaller than the signal strength of the macro cell base station.

The counting information may be periodically transmitted to the macro cell base station through an X2 interface.

In the fourth operation of obtaining the counting data through the small cell base and calculating the ABS ratio by using the counting data, the ABS ratio may be calculated by the equation below:

$$ABSratio \approx \left(\frac{\omega}{BIAS}\right)\left(\frac{N+1}{N}\right)\left(\frac{\beta}{\alpha+\beta}\right)\left(\frac{\beta}{\beta+\gamma}\right)$$

wherein, α is the number of terminals serviced by a genuine small cell, β is the number of terminals serviced by a CRE area, γ is the number of terminals serviced by a macro cell, N is the number of small cells in a macro cell, BIAS is an offset value (dB) that is applied to CRE, and ω is the maximum performance parameter.

Another aspect of the present invention provides a method of controlling interference in a heterogeneous network environment, the method including: a fifth operation of measuring, by a terminal located in a coverage area of a small cell base station, signal strengths of a macro cell base station and the small cell base station, and broadcasting or unicasting, by the small cell base station, data having a cell range expansion (CRE) value; a sixth operation of comparing signal strengths of the small cell base station and the macro cell base station or of the small cell base station and one or more nearby small cell base stations, and according to a result of the comparison, turning on or off a CRE flag value of the terminal, and transmitting the CRE flag value to the small cell base station; and a seventh operation of respectively counting terminals located in a CRE area and terminals located in a coverage area of the small cell base station, based on the CRE flag value received through the terminal at a predetermined period of measurement in the sixth operation, and transmitting the counting data to the macro cell base station.

The seventh operation may include an eighth operation of obtaining the counting data through the small cell base station located in the coverage area of the macro cell base station, calculating an almost blank subframe (ABS) ratio by using the counting data, sending the small cell base station ABS data to which the calculated ABS ratio is applied, and scheduling, by the small cell base station, the terminal located in the CRE area by using the ABS data received from the macro cell base station.

In the sixth operation, the CRE flag value of the terminal may be turned off and transmitted to the small cell base station if the signal strength of the small cell base station is greater than the signal strength of the macro cell base station or the signal strength of the one or more nearby small cell base stations; and a handoff to the macro cell base station or the one or more nearby small cell base station may be performed according the CRE flag value of the terminal based on a comparison result between the signal strength of the small cell base station having the CRE value applied thereto and the signal strength of the macro cell base station, if the signal strength of the small cell base station is smaller than the signal strength of the macro cell base station, to turn off the CRE flag value of the terminal.

Advantageous Effects

A small cell coverage area can be randomly expanded by applying a cell range expansion (CRE) scheme in a heterogeneous network environment, a signal interference of a terminal located in an expanded coverage area can be minimized, and the network performance of the entire network can be significantly improved by applying the optimum ratio of an almost blank subframe (ABS).

The effect of the invention is not limited to the above, and other effects having not been mentioned above will be readily understood to those skilled in the art through the following description.

BEST MODE OF THE INVENTION

Figure 1:
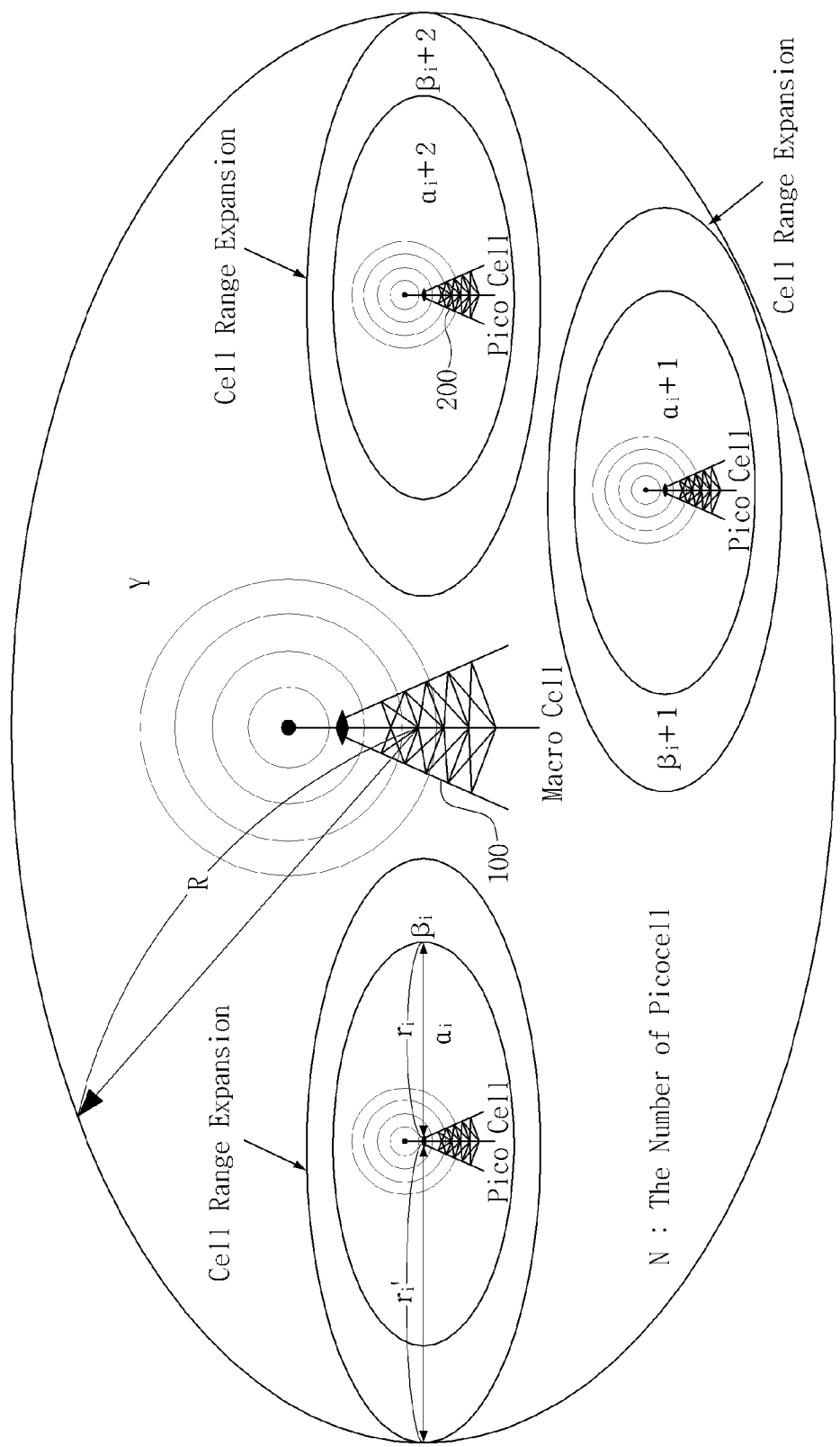
FIG. 1 is a first schematic diagram illustrating the entire configuration of a heterogeneous network environment according to the present invention.

The objects and effects, and the technical constructions therefor will become readily apparent by reference to the following detailed description when considered in conjunction with the accompanying drawings. In the description of the embodiment, the detailed description of related known functions or constructions will be omitted herein to avoid making the subject matter of the embodiment ambiguous. In addition, terms which will be described below are defined in consideration of structure, actions and functions in the embodiments of the present invention, and may vary with an intention of a user and an operator or a custom.

However, the scope of the present invention is not limited to such embodiments and the present invention may be realized in various forms. The embodiments to be described below are provided only to bring the disclosure of the present invention to perfection and assist those skilled in the art to completely understand the present invention. The present invention is defined only by the scope of the appended claims.

It will be further understood that the terms "comprises", "comprising,", "includes" and/or "including", when used herein, specify the presence of stated elements, but do not preclude the presence or addition of one or more other elements, unless the context clearly indicates otherwise. The terms "unit" and "module" denotes a processing unit of processing at least one function or operation, and may be implemented as hardware, software or a combination of hardware and software.

Meanwhile, each element, each function block or each means may be provided as one or more of the number of elements, function blocks and means, and the electrical functions, electronic functions and mechanical functions performed by each element may be implemented using various elements or mechanical components generally known in the art, and the various elements or mechanical components may be provided such that the respective elements are separated or merged into one.

In addition, a combination of respective blocks in the accompanying block diagrams and a combination of respective operations in the accompanying flowchart may be performed by computer program instructions. The computer program instructions may be loaded on a general purpose computer, a specific purpose computer or a processor of a programmable data processing device, and the instructions executed by the computer or the processor of the programmable data processing device generate a means for performing functions described in each block of the block diagram and each operation of the flowchart. In order to implement the functions of the computer program instructions in a specific manner, the computer program instructions may be stored by a computer, a use of a computer for a programmable data processing device, or a computer readable memory; and the instructions stored by the use of a computer or the computer readable memory may produce a manufactured item including an instruction means for performing the functions described in each block of the block diagram and each operation of the flowchart. The computer program instructions may be loaded on a computer or programmable data processing device, and as a series of operations thereof are performed on the computer or the programmable data processing device to generate a computer executable process, the instructions executed by the computer or programmable data processing device may provide procedures for executing the functions described in each block of the block diagram and each operation of the flowchart.

In addition, each block or each operation may represent a part of a module, a segment or a code each including one or more executable instructions for executing a specific logical function (functions). For example, two blocks shown in succession may in fact be executed substantially concurrently or the blocks may sometimes be executed in the reverse order, depending upon the functionality/acts involved.

Hereinafter, embodiments of the present invention will be described in detail with reference to accompanying drawings.

Figure 2:
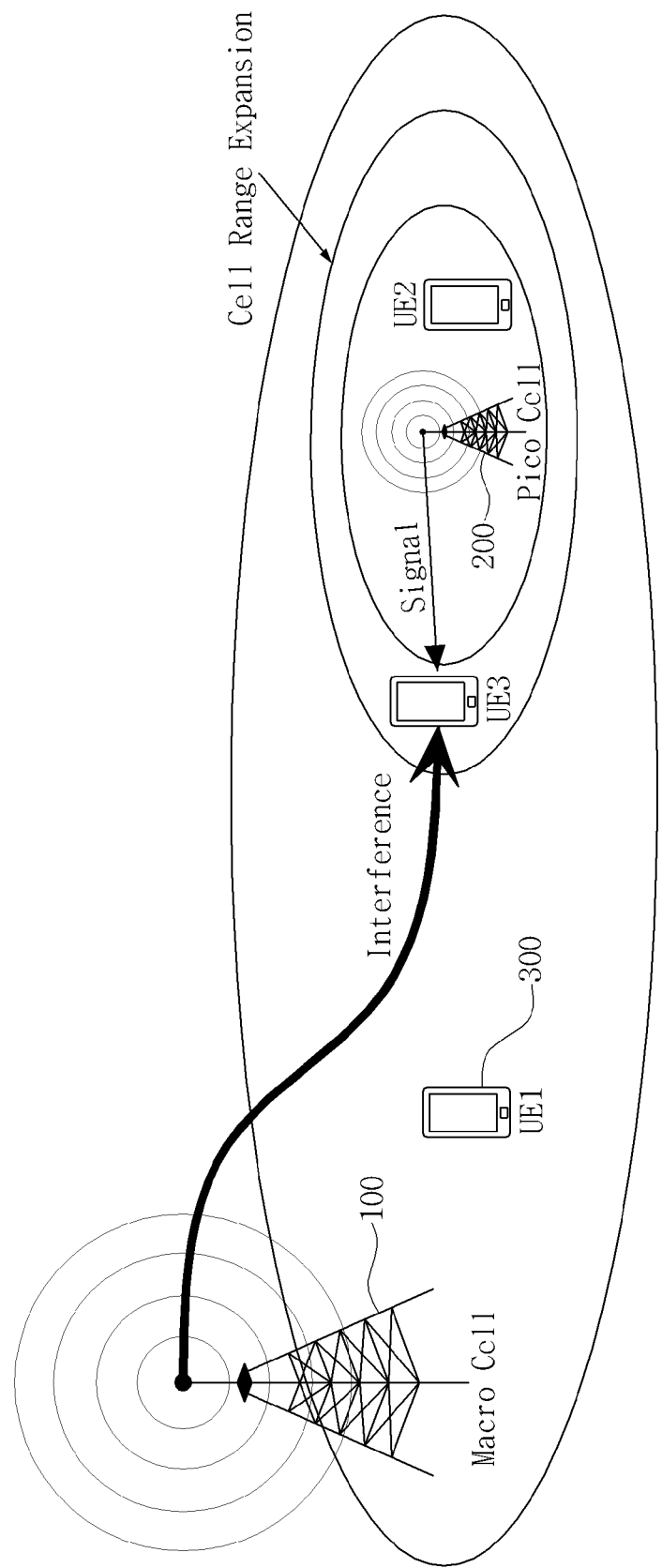
FIG. 2 is a second schematic diagram illustrating the entire configuration of a heterogeneous network environment according to the present invention.
Figure 3:
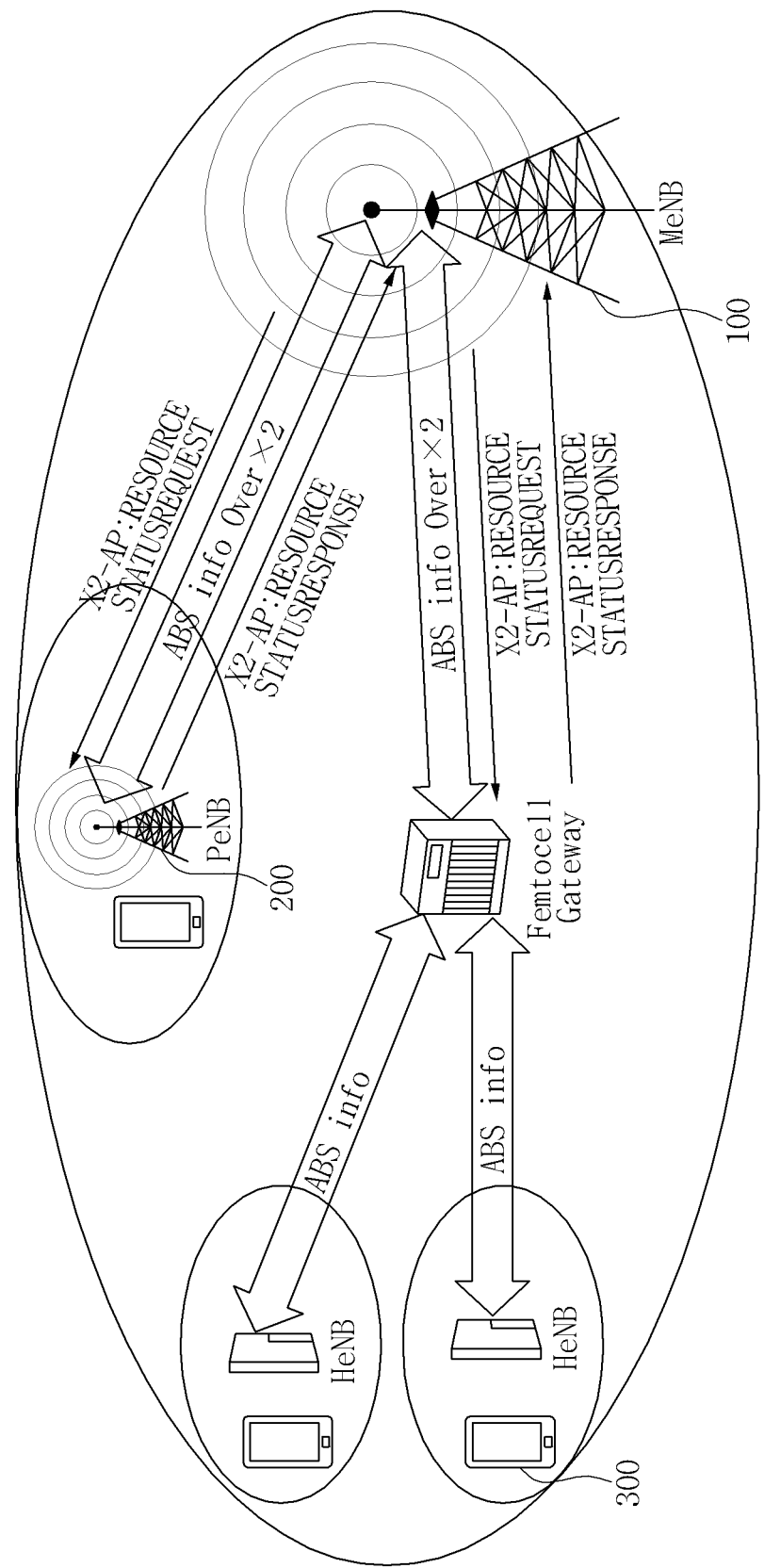
FIG. 3 is a third schematic diagram illustrating the entire configuration of a heterogeneous network environment according to the present invention.
Figure 4:
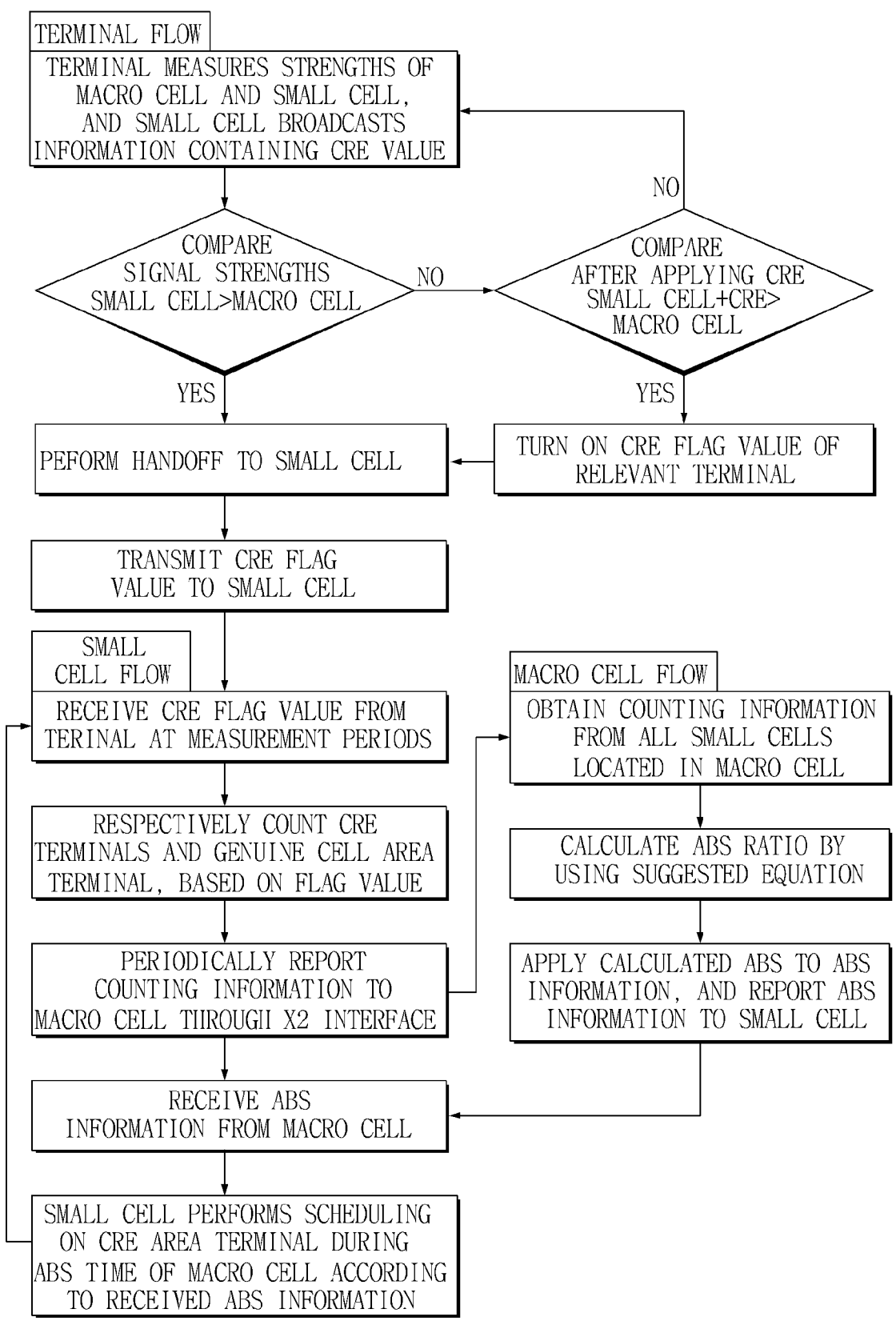
FIG. 4 is a first flowchart showing a method of controlling interference in a heterogeneous network environment according to the present invention.
Figure 5:
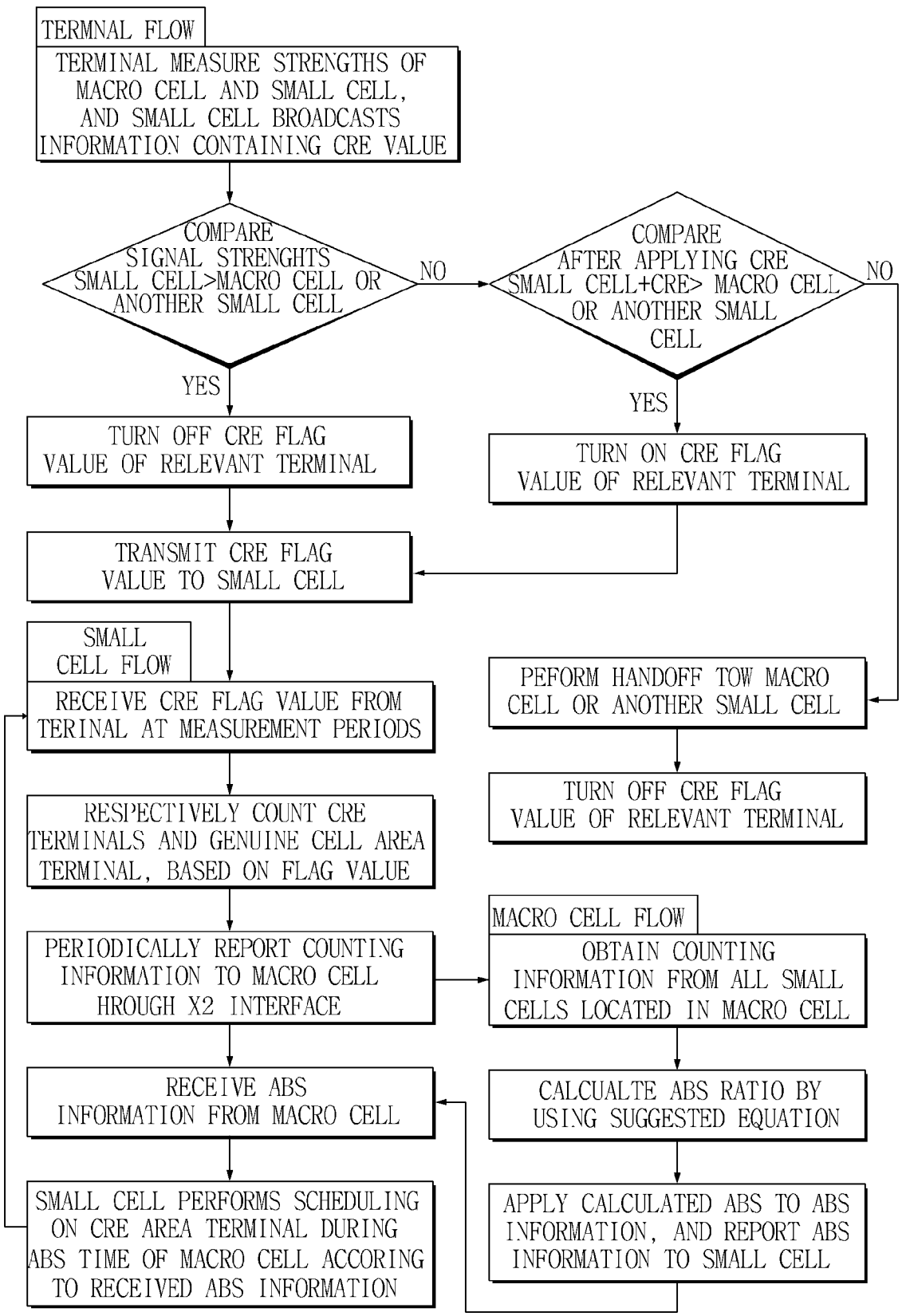
FIG. 5 is a second flowchart showing a method of controlling interference in a heterogeneous network environment according to the present invention.

FIG. 1 is a first schematic diagram illustrating the entire configuration of a heterogeneous network environment according to the present invention, FIG. 2 is a second schematic diagram illustrating the entire configuration of a heterogeneous network environment according to the present invention, FIG. 3 is a third schematic diagram illustrating the entire configuration of a heterogeneous network environment according to the present invention, FIG. 4 is a first flowchart showing a method of controlling interference in a heterogeneous network environment according to the present invention, and FIG. 5 is a second flowchart showing a method of controlling interference in a heterogeneous network environment according to the present invention.

Referring to the accompanying drawings, a method of controlling interference in a heterogeneous network environment according to the embodiment of the present invention is provided by including a plurality of low power small cell base stations 200, a macro cell base station 100 and a plurality of terminals 300. The plurality of small cell base stations 200 each have a service area smaller than that of a macro cell base station 100, and are disposed to enable hot-spot based services in an area of the macro cell base station 100. The terminals 300 are located in a service area of the macro cell base station 100 or a service area of the small cell base station 200 so as to be serviced by the small cell base station 200. The method is provided to randomly expand the coverage area for service of the small cell base station 200 by using a cell range expansion (CRE) scheme, minimize signal interference of a terminal 300 located in the expanded coverage area of the small cell base station 200 from the macro cell base station 100 by applying the optimum ratio of an almost blank subframe (ABS), and also to significantly improve the performance of the entire network. In the method, the macro base station has a coverage of the small cell base station or a coverage of a nearby small cell base station, and the small cell base station is provided to have a coverage area expanded using the CRE scheme. The method is achieved by performing a first operation to a third operation, and further a fourth operation.

HetNet represents a LTE based network environment constructed by deploying a plurality of low power small cell base stations 200 each having a narrow service coverage radius in a service coverage radius of the macro cell base station 100, and HetNet may operate in a closed subscriber group (CSG) mode including the macro cell base station 100 and the small cell base station 200 constructed by a plurality of femtocells, or may operate by including the macro cell base station 100 and the small cell base station constructed by a picocell. In general, HetNet is provided to operate in an open mode or a hybrid mode.

The small cell base station 200 is a low power radio base station using an allowed frequency bandwidth, and has a service coverage area smaller than that of the macro cell base station 100, and is provided using microcells, picocells, and femtocells. Although the small cell base station 200 according to the present embodiment is provided using a picocell that has the maximum transmission power of 0.25 W indoors and 5 W outdoors and operates as a hotspot region inside/outside houses or business buildings, the configuration of the small cell base station 200 is not limited thereto.

The CRE scheme is provided to expand the cell area of the small cell base station 200, and is achieved by assigning a certain offset value to a transmission power based service radius of the small cell base station 200, such that the terminal 300 selects the small cell base station 200 rather than the macro cell base station 100 as a service cell, and thus a service cell of the terminal 300 using a great amount of data is changed from the macro cell base station 100 to the small cell base station 200, to distribute the data traffic loads of the macro cell base station 100.

In this case, a terminal 300 located in the expanded area of the small cell base station 200 (hereinafter, referred to as a CRE area), that is, a CRE cell area has a signal interference due to the macro cell base station 100, and since the macro cell base station 100 has a downlink signal strength greater than that of the small cell base station 200, the terminal located in the CRE area of the small cell base station 200 may loss packets. Accordingly, there is a need to apply ABS, which is one of the eICIC technologies suggested by 3GPP Rel-10 and Rel-11, for mitigating the signal interference at cell edges.

That is, the CRE scheme is achieved by adding a Tx power value (BIAS) of the small cell base station 200 that is recognized by the terminal 300, to randomly expand the coverage radius of the small cell base station 200. In this case, the terminal 300 located in the CRE area and the macro cell 100 as a service cell are subject to a handover to have the small cell base station 200 as a service cell. Meanwhile, the terminal 300 receives an actual Tx power value of the macro cell base station 100 greater than an actual Tx power value of the small cell base station 200, in which a Tx power value received from the small cell base station 200 is a value obtained by adding a random BIAS value, and thus is greater than the actual Tx power value of the small cell base station 200 that is to be transmitted to the terminal 30.

Accordingly, the terminal 300 has signal interference as the signal received from the macro cell base station 100 is greater than that received from the small cell base station 200, which is a service cell of the terminal 300. Therefore, ABS, one of the eICIC schemes in the 3GPP Rel. 11 standards, is applied to mitigate the signal interference by serving the terminal 300 located in the CRE area when the macro cell base station 100 transmits an empty subframe.

The applying of ABS is achieved by using an X2 interface. The macro base station 100 sets an ABS pattern, and the set information is shared between the macro cell base station 100 and the small cell base station 200 through an X2 interface. If a small cell base station 20 is a femtocell, the small cell base station 200 is not directly connected to the macro cell base station 100, but shares ABS pattern information of the macro cell base station 100 through a femtocell gateway. Preferably, when the small cell base station 200 receives ABS information from the macro cell base station 100, a service scheduling is performed on the terminal 300 located in a CRE area during a subframe time at which a corresponding ABS is set.

In this case, the macro cell base station 100 is provided to determine ABS pattern information, and transmit wireless communication data including the determined ABS pattern, wherein the small call base station 200 may request desired ABS pattern information from the macro cell base station 100 by using an invoke information element. That is, the macro cell base station 100 may make a request of the small cell base station 200 by setting information in a corresponding element, and preferably, the ABS pattern may be defined in a unit of 40 ms.

In addition, the macro cell base station 100 may be provided to receive preset ABS status information by requesting a resource block ratio of ABS allocated for a terminal 300 in a resource status, from the small cell station 200, to adjust the number of ABS subframes.

In addition, the macro cell base station 100 may periodically receive relevant information for determining the ABS pattern from the small cell base station 200, to determine the number of ABS subframes.

In addition, the macro cell base station 100 may be provided to request effective factor data of the small cell base station 200 through an X2 interface, that is, effective factor data including the number of terminals 300 located in a genuine small cell, the number of terminals 300 located in a CRE area and a BIAS setting value.

In addition, the macro cell base station 100 may be provided to request the effective factor in a frame unit of 10 ms.

In addition, the macro cell base station 100 may be provided to obtain the effective factor information from all small cell base stations 200 managed by the macro cell base station 100, except a small cell base station 200 having a BIAS value of 0.

In addition, the macro cell base station 100 is provided to calculate the number of additional small cell base stations 200, an average BIAS value, and the maximum performance parameter. The maximum performance value may be provided to be assigned to vary depending on the region in which the base station is located.

In addition, the macro cell base station 100 is provided to calculate an ABS ratio by applying the obtained effective factor to an equation, in which the calculated ABS ratio is determined not to exceed 50% when the maximum ABS ratio is 100%, the ABS ratio is calculated in a predetermined period, and a subframe to be an ABS is randomly determined to satisfy the ratio.

Meanwhile, the method of controlling interference in a heterogenous network environment includes the following operations. In the first operation, the terminal 300 located in a coverage area of the macro cell base station 100 measures signal strengths of the macro cell base station 100 and the small cell base station 200; and the small cell base station 200 broadcasts data having a cell range expansion (CRE) value by use of system information block (SIB) if the terminal 300 is in an idle status, or unicasts data having a cell range expansion (CRE) value by use of radio resource control (RRC) if the terminal 300 is in a connected status.

Then, in the second operation, a CRE flag value is transmitted to the small cell base station 200 by performing a hand-off to the small cell base station 200 according to a result of comparison of the signal strengths of the small cell base station 200 and the macro cell base station 100, which is obtained from the first operation.

In the second operation, the terminal 300 transmits a CRE flag value to the small cell base station 200 by performing a hand-off to the small cell base station 200 if the signal strength of the small cell base station 200 is greater than the signal strength of the macro cell base station 100, and transmits a CRE flag value to the small cell base station 200 by performing a handoff to the small cell base station 200 according to the CRE flag value of the terminal 300 based on a comparison result between the signal strength of the small cell base station 200 having a CRE value applied thereto and the signal strength of the macro cell base station 100, if the signal strength of the small cell base station 200 is smaller than the signal strength of the macro cell base station 100.

In the third operation, terminals 300 located in a CRE area and terminals 300 located in a coverage area of the small cell base station 200 are respectively counted based on the CRE flag value received through the terminal 300 at a predetermined period for measurement, and the counting data is transmitted to the macro cell base station 200.

In the third operation, the counting information is periodically transmitted to the macro cell base station 100 through an X2 interface.

In the fourth operation, the counting data is obtained through the small cell base station 200 located in the coverage area of the macro cell base station 100 from the third operation, an almost blank subframe (ABS) ratio is calculated by using the counting data, ABS data to which the calculated ABS is applied is sent to the small cell base station 200, and the small cell base station 200 schedules the terminal 300 located in the CRE area by using the ABS data received from the macro cell base station 100.

In the fourth operation of obtaining the counting data through the small cell base 200 and calculating the ABS ratio by using the counting data, the ABS ratio is calculated by the Equation below.

$$ABSratio \approx \left(\frac{\omega}{BIAS}\right)\left(\frac{N+1}{N}\right)\left(\frac{\beta}{\alpha+\beta}\right)\left(\frac{\beta}{\beta+\gamma}\right) \quad \text{Equation}$$

wherein, $\alpha$ is the number of terminals serviced by a genuine small cell, $\beta$ is the number of terminals serviced by a CRE area, $\gamma$ is the number of terminals serviced by a macro cell, N is the number of small cells in a macro cell, BIAS is an offset value (dB) that is applied to CRE, and $\omega$ is the maximum performance parameter.

[Mode of the Invention]

A method of controlling interference in a heterogeneous network environment according to another embodiment of the present invention includes a fifth operation to an eighth operation.

In the fifth operation, the terminal 300 located in a coverage area of the small cell base station 200 measures signal strengths of the macro cell base station 100 and the small cell base station 200, and data having a cell range expansion (CRE) value is broadcasted.

In the sixth operation, signal strengths are compared between the small cell base station 200 and the macro cell base station 100, or between the small cell base station 200 and one or more nearby small cell base stations 200, in which the signal strengths are obtained from the fifth operation, and according to a result of the comparison, a CRE flag value of the terminal 300 is either turned on or off, and is transmitted to the small cell base station 200.

In the sixth operation, the CRE flag value of the terminal 300 is turned off and transmitted to the small cell base station 200 if the signal strength of the small cell base station 200 is greater than the signal strength of the macro cell base station 100 or the signal strength of the one or more nearby small cell base stations 200; and a handoff to the macro cell base station 100 or the one or more nearby small cell base station is performed according to the CRE flag value of the terminal 300 based on a comparison result between the signal strength of the small cell base station 200 having the CRE value applied thereto and the signal strength of the macro cell base station 100, if the signal strength of the small cell base station 200 is smaller than the signal strength of the macro cell base station 100, to turn off the CRE flag value of the terminal 300.

In the seventh operation, the terminals 300 located in a CRE area of the small cell base station 200 expanded by the CRE scheme and the terminals 300 located in a coverage area of the small cell base station 200 are respectively counted based on the CRE flag value received through the terminal at a predetermined period of measurement from the sixth operation, and the counting data is transmitted to the macro cell base station 100.

In the eighth operation, the counting data is obtained through the small cell base station 200 located in the coverage area of the macro cell base station 100 from the seventh operation, an almost blank subframe (ABS) ratio is calculated by using the counting data, ABS data to which the calculated ABS ratio is applied is sent to the small cell base station 200, and the small cell base station 200 schedules the terminal located in the CRE area by using the ABS data received from the macro cell base station 100.

The method of controlling interference in a heterogeneous network according to the prevent invention can randomly expand a small cell coverage area by applying a cell range expansion (CRE) scheme in a heterogeneous network environment, minimize a signal interference of a terminal located in an expanded coverage area, and significantly improve the network performance of the entire network by applying the optimum ratio of an almost blank subframe (ABS).

While the invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

The present invention is provided to randomly expand a small cell coverage area by using a cell range expansion (CRE) scheme in a heterogeneous network environment, minimize a signal interference of a terminal located in an expanded coverage area, and significantly improve the network performance of the entire network by applying the optimum ratio of an almost blank subframe (ABS).

The invention claimed is:

1. A method of controlling interference in a heterogeneous network environment, the method comprising:
    receiving, by a small cell base station during a measurement period, cell range expansion (CRE) flag values from a plurality of terminals located in a coverage area of a macro cell base station, the CRE flag value for a terminal being set by the terminal based on a signal strength of the macro cell base station measured by the terminal, a signal strength of the small cell base station measured by the terminal, and data having a CRE value that is received by the terminal from the small cell base station
    generating counting data by respectively counting terminals located in a CRE area and terminals located in a coverage area of the small cell base station, based on the received CRE flag values; and
    transmitting the counting data to the macro cell base station,
    wherein the small cell base station receives a first CRE flag if the measured signal strength of the small cell base station is greater than the measured signal strength of the macro cell base station, and receives a second CRE flag if the measured signal strength of the small cell base station is equal to or less than the measured signal strength of the macro cell base station and if the measured signal strength of the small cell base station having the CRE value applied thereto is greater than the measured signal strength of the macro cell base station.

2. The method of claim 1, further comprising:
    receiving almost blank subframe (ABS) data from the macro cell base station, the ABS data including an ABS ratio calculated by the macro cell base station based on the counting data; and
    scheduling, by the small cell base station to control interference, a terminal located in the CRE area by using the ABS data received from the macro cell base station.

3. The method of claim 1, wherein the counting information is periodically transmitted to the macro cell base station through an X2 interface.

4. The method of claim 2, wherein the ABS ratio is calculated by the equation below:

$$ABSratio \approx \left(\frac{\omega}{BIAS}\right)\left(\frac{N+1}{N}\right)\left(\frac{\beta}{\alpha+\beta}\right)\left(\frac{\beta}{\beta+\gamma}\right)$$

wherein, α denotes a number of terminals serviced by a genuine small cell, β denotes a number of terminals serviced by a CRE area, γ denotes a number of terminals serviced by a macro cell, N denotes a number of small cells in the macro cell, BIAS denotes an offset value (dB) that is applied to the CRE area, and ω denotes a maximum performance parameter.

5. A method of controlling interference in a heterogeneous network environment, the method comprising:
    receiving, by a small cell base station during a measurement period, cell range expansion (CRE) flag values from a plurality of terminals located in a coverage area of a macro cell base station, the CRE flag value for a terminal being set by the terminal based on a signal strength of the macro cell base station measured by the terminal, a signal strengths of the small cell base station measured by the terminal, signal strengths of one or more nearby small cell base stations measured by the terminal, and data having a CRE value that is received by the terminal from the small cell base station;

generating counting data by respectively counting terminals located in a CRE area and terminals located in a coverage area of the small cell base station, based on the received CRE flag values; and transmitting the counting data to the macro cell base station, wherein the small cell base station receives a first CRE flag value if the signal strength of the small cell base station is greater than the signal strength of the macro cell base station or the signal strengths of the one or more nearby small cell base stations; and receives a second CRE flag value if the signal strength of the small cell base station is less than or equal to the signal strength of the macro cell base station or the signal strengths of the one or more nearby small cell base stations and if the measured signal strength of the small cell base station having the CRE value applied thereto is greater than the measured signal strength of the macro cell base station.

6. The method of claim 5, further comprising:
receiving almost blank subframe (ABS) data from the macro cell base station, the ABS data including an ABS ratio calculated by the macro cell base station based on the counting data; and
scheduling, by the small cell base station to control interference, a terminal located in the CRE area by using the ABS data received from the macro cell base station.

7. The method of claim 1, wherein the first CRE flag value is off and the second CRE flag value is on.

8. The method of claim 5, wherein the first CRE flag value is off and the second CRE flag value is on.

9. The method of claim 1, wherein the small cell base station is located in the coverage area of the macro cell base station.

10. The method of claim 5, wherein the small cell base station is located in the coverage area of the macro cell base station.

11. The method of claim 1, wherein the CRE value is a CRE transmit power bias value.

12. The method of claim 5, wherein the CRE value is a CRE transmit power bias value.

13. A method of controlling interference in a heterogeneous network environment, the method comprising:
measuring, by a terminal located in a coverage area of a macro cell base station, a signal strength of the macro cell base station and a signal strength of a small cell base station that is located in the coverage area of the macro cell base station;
receiving, from the small cell base station, data having a cell range expansion (CRE) value;
comparing the measured signal strength of the small cell base station and the measured signal strength of the macro cell base station;
setting a CRE flag to a first value when the measured signal strength of the small cell base station is greater than the measured signal strength of the macro cell base station;
setting the CRE flag to a second value when the measured signal strength of the small cell base station is less than or equal to the measured signal strength of the macro cell base station and when the signal strength of the small cell base station having the received CRE value applied thereto is greater than the measured signal strength of the macro cell base station;
transmitting the CRE flag to the small cell base station; and
receiving scheduling to control interference,
wherein the CRE flag having the first value is transmitted if the measured signal strength of the small cell base station is greater than the measured signal strength of the macro cell base station, and the CRE flag having the second value is transmitted if the measured signal strength of the small cell base station is equal to or less than the measured signal strength of the macro cell base station and if the measured signal strength of the small cell base station having the CRE value applied thereto is greater than the measured signal strength of the macro cell base station.

14. A method of controlling interference in a heterogeneous network environment, the method comprising:
receiving, from a small cell base station, a number of terminals serviced by a genuine small cell of the small cell base station and a number of terminals serviced by a cell range expansion (CRE) area of the small cell base station;
calculating an almost blank subframe (ABS) ratio according to the received number of terminals genuinely serviced by the small cell base station and the received number of terminals serviced by the CRE area of the small cell base station; and
transmitting, to the small cell base station, ABS data to which the calculated ABS ratio is applied in order to schedule the terminals to control interference,
wherein a first CRE flag is transmitted if a measured signal strength of the small cell base station is greater than a measured signal strength of a macro cell base station, and a second CRE flag is transmitted if the measured signal strength of the small cell base station is equal to or less than the measured signal strength of the macro cell base station and if the measured signal strength of the small cell base station having the CRE value applied thereto is greater than the measured signal strength of the macro cell base station.

15. The method of claim 14, wherein the ABS ratio is calculated by the equation below:

$$ABSratio \approx \left(\frac{\omega}{BIAS}\right)\left(\frac{N+1}{N}\right)\left(\frac{\beta}{\alpha+\beta}\right)\left(\frac{\beta}{\beta+\gamma}\right)$$

wherein, $\alpha$ denotes the number of terminals serviced by the genuine small cell, $\beta$ denotes the number of terminals serviced by the CRE area, $\gamma$ denotes a number of terminals serviced by a macro cell in which the small cell base station is located, N denotes a number of small cells in the macro cell, BIAS denotes an offset value (dB) that is applied to the CRE area, and $\omega$ denotes a maximum performance parameter.

* * * * *